United States Patent [19]

Eberly, Jr.

[11] 4,263,020
[45] Apr. 21, 1981

[54] REMOVAL OF SULFUR FROM PROCESS STREAMS

[75] Inventor: Paul E. Eberly, Jr., Baton Rouge, La.

[73] Assignee: Exxon Research & Engineering Co., Florham Park, N.J.

[21] Appl. No.: 109,159

[22] Filed: Jan. 2, 1980

[51] Int. Cl.³ .............................................. B01D 53/04
[52] U.S. Cl. ........................................ 55/62; 55/73; 55/74
[58] Field of Search ................. 55/62, 73, 74, 75; 252/463, 475; 423/230

[56] References Cited

U.S. PATENT DOCUMENTS

| | | | |
|---|---|---|---|
| 3,024,868 | 3/1962 | Milton | 55/73 X |
| 3,078,634 | 2/1963 | Milton | 55/73 X |
| 3,492,083 | 1/1970 | Lowicki et al. | 55/73 X |
| 3,692,701 | 9/1972 | Box, Jr. | 252/463 X |
| 3,751,508 | 8/1973 | Fujiso et al. | 252/463 X |
| 3,939,250 | 2/1976 | Michel et al. | 423/230 X |
| 3,953,587 | 4/1976 | Lee et al. | 55/73 X |
| 4,049,582 | 9/1977 | Erickson et al. | 252/463 X |
| 4,055,513 | 10/1977 | Wheelock | 252/463 X |
| 4,088,736 | 5/1978 | Courty et al. | 423/230 |

FOREIGN PATENT DOCUMENTS 871076 6/1961 United Kingdom .

Primary Examiner—Robert H. Spitzer
Attorney, Agent, or Firm—Llewellyn A. Proctor

[57] ABSTRACT

A process wherein a particulate mass of a metal alumina spinel, $MAl_2O_4$ wherein M is chromium, iron, cobalt, nickel, copper, cadmium or mercury, particularly zinc alumina spinel ($ZnAl_2O_4$), is contacted with a process stream which contains sulfur, sulfur compounds, and other contaminants, these being adsorbed onto said particulate mass of metal alumina spinel, and the process stream thereby denuded of said sulfur, sulfur compounds, and other contaminants. Thereafter, the sulfur, sulfur compounds, and other contaminants, are readily desorbed, or removed from said particulate mass of metal alumina spinel by contacting, and purging same with a relatively clean gas stream, suitably hydrogen, hydrogen-containing gas, or an inert gas, at elevated temperature.

13 Claims, No Drawings

REMOVAL OF SULFUR FROM PROCESS STREAMS

BACKGROUND OF THE INVENTION AND PRIOR ART

Sulfur occurs in many industrial processes, and sulfur, or sulfur containing compounds, for varying reasons must often be removed from process streams, e.g., flue gas, waste gas or recycle gas streams. This has been accomplished, e.g., by contacting the sulfur-containing process stream with a sorbent comprising a particulate oxide, hydrated oxide, or hydroxide of alumina, zinc, iron, nickel, cobalt or the like, alone or in admixture with each other or with additional materials, e.g., alkali or alkaline earth metal oxides or the like. Reference is made, e.g., to U.S. Pat. No. 3,492,083 and British Pat. No. 871,076 (1957) which describes processes of this type. Hot spherical pebbles have also been used to remove sulfur from process streams, as described, e.g., in U.S. Pat. No. 2,551,905.

The quantity of these sorbents for the removal of sulfur varies considerably, and in many applications it is essential to scrub essentially all of the sulfur from the process streams. This is done for process reasons, as well as environmental reasons. Sulfur, for example, is a well known catalyst poison which finds its way into a process principally via the feed, and it can gradually accumulate upon and poison a catalyst. Essentially all petroleum feeds, contain sulfur. Most of the sulfur, because of this adverse effect, is generally removed from the feed, e.g., by contact with nickel or cobalt oxide guard chambers.

Catalytic reforming, or hydroforming, a well-known and important process employed in the petroleum refining industry for improving the octane quality of naphthas and straight run gasolines, is illustrative of a process where the presence of sulfur can have a detrimental effect. In a typical reforming process, a series of reactors are provided with fixed beds of sulfided catalyst which are sequentially contacted with a naphtha feed, and hydrogen, and each reactor is provided with a preheater, or interstage heater, because the reactions which take place are endothermic.

In use of the more recently developed multi-metallic platinum catalysts wherein an additional metal, or metals hydrogenation-dehydrogenation component is added as a promoter to the platinum, it has in fact become essential to reduce the feed sulfur to only a few parts, per million parts by weight of feed (ppm), because of the sulfur sensitiveness of these catalysts. For example, in the use of platinum-rhenium catalysts it is generally necessary to reduce the sulfur concentration of the feed well below about 10 ppm, and preferably well below about 2 ppm, to avoid excessive loss of catalyst activity and $C_5^+$ liquid yield.

The sulfur must also be scrubbed from the hydrogen recycle stream because this too is a source of catalyst sulfur contamination. The vapor effluent from the last reactor of the series is thus a gas rich in hydrogen, which can contain hydrogen chloride, chlorine, hydrogen sulfide, moisture and small amounts of normally gaseous hydrocarbons. It is essential to separate hydrogen from the $C_5^+$ liquid product and recycle it to the process; and it is essential to remove the sulfur from the recycle hydrogen gas stream. This, as suggested, has been accomplished by the use of guard chambers filled with metal oxides, e.g., zinc oxide, supra.

Zinc oxide thus has been used as a sorbent for selectively removing hydrogen sulfide from process streams. Usually, the zinc oxide is contacted with the gas at elevated temperatures to scrub out the sulfur. Such sorbent, however, has not proven successful because the adsorption rate is too low, and it has not been possible to regenerate such sorbent in a reducing atmosphere such as hydrogen due to the high thermodynamic stability of zinc sulfide. Regeneration of this material requires oxidation of the sulfur, or sulfur-containing compounds, so that the sulfur is evolved as sulfur oxides, an environmentally unacceptable product. Such regeneration impairs the mechanical strength of the material. Moreover, sulfur oxides are difficult to remove from flue gas effluents, e.g., as contrasted with hydrogen sulfide which is easily scrubbed from the stream with a caustic or amine solution.

An attempt to improve the quality of zinc oxide as a sorbent for process streams, and improve its quality for regeneration, is disclosed in U.S. Pat. No. 4,088,736. In accordance with the process disclosed therein, a hydrogen sulfide containing gas is contacted with a pre roasted adsorption material comprised of a shaped, homogenous mixture of 20-85% zinc oxide, 0.9-50% alumina, 0-30% silica, and 2-45% of a Group II-A metal oxide. In use of the sorbent, it would appear that the adsorption qualities and mechanical strength of the sorbent on regeneration is somewhat improved, as contrasted with zinc oxide alone. The sulfur on regeneration, in either event, is liberated as sulfur oxides.

Whereas these processes have provided varying degrees of success for their intended purpose, further improvements are nonetheless desirable.

It is, accordingly, the primary object of the present invention to fill this need.

A specific object is to provide a new and improved process, particularly one utilizing a sorbent which is capable of high rates of sulfur adsorption from process streams, and more particularly one which can be regenerated without significant loss of mechanical strength, if any.

A more specific object is to provide a process as characterized which utilizes a sorbent which readily adsorbs hydrogen sulfide from gas streams, a sorbent which can be regenerated by simply stripping the hydrogen sulfide from the sorbent with a gas, and the hydrogen sulfide readily removed from the stripping gas, suitably by contact with an alkali or amine solution.

A yet more particular object is to provide a process which utilizes a sorbent admirably suitable for selectively removing hydrogen sulfide, and other sulfur compounds and contaminants at high effectiveness from a recycle hydrogen stream, particularly a moisture bearing acidic recycle hydrogen stream as employed in a reforming operation, especially one which permits recovery of the adsorbed hydrogen sulfide, as hydrogen sulfide, from the sorbent by use of a simple gas purge.

These objects and others are achieved in accordance with the present invention, embodying a process wherein a particulate mass of a metal alumina spinel, $MAl_2O_4$ wherein M is chromium, iron, cobalt, nickel, copper, cadmium or mercury, particularly zinc alumina spinel ($ZnAl_2O_4$), is contacted with a process stream which contains sulfur, sulfur compounds, and other contaminants, these being adsorbed onto said particulate mass of metal alumina spinel, and the process stream thereby denuded of said sulfur, sulfur compounds, and other contaminants. Thereafter, the sulfur, sulfur compounds, and other contaminants, are readily desorbed, or removed from said particulate mass of metal alumina spinel by contacting, and purging same with a relatively clean gas stream, suitably hydrogen, or a hydrogen-containing gas, at elevated temperature.

In a preferred operation, a particulate mass of metal alumina spinel, notably the zinc alumina spinel, is charged, or packed into a guard chamber, or series of guard chambers. Most preferably, the series of metal alumina spinel guard chambers are employed in parallel, this permitting active use of one guard chamber, or set of serially aligned guard chambers for contact, and purification of a process stream while the other guard chamber, or set of serially aligned guard chambers, is cut out of series for regeneration. In the treatment of a hydrogen recycle gas stream, as employed in reforming, it is found that the hydrogen sulfide can be readily adsorbed from the stream despite the high moisture content of the gas. This is mildly surprising because it is well known that the selectivity of many sorbents for hydrogen sulfide is adversely affected in the presence of water. The spinel, notably the zinc alumina spinel, is also quite stable whereas many materials in contrast are deteriorated by contact with the acid. Moreover, the spinel, notably the zinc alumina spinel, shows a high capacity for adsorption of the hydrogen sulfide, several times that of many sulfur sorbent materials. No special preparation of the particulate zinc alumina spinel is required, and it can be employed in a guard chamber as powder, spheres, tablets, pellets, extrudates, irregular shaped particles, or the like in virtually any size.

The temperature of contact is not critical, and there is no necessity to heat or cool the process stream, notably the recycle gas stream. Suitably, the recycle hydrogen stream is contacted with the particulate zinc alumina spinel sorbent at normal gas stream temperatures, i.e., at temperatures ranging from ambient to about 500° F., or more generally at temperatures ranging from about 100° F. to about 300° F.

It would appear, surprisingly, that the metal atoms of the metal alumina spinel structure, notably the zinc atoms of the zinc alumina spinel, forms simple adsorption bonds with the sulfur compound, this being sufficient to remove, e.g., hydrogen sulfide from a recycle hydrogen gas stream. Unlike the mechanism involved in the removal of a sulfur compound, e.g., hydrogen sulfide from a recycle hydrogen gas stream by the use of zinc oxide, there is no chemical reaction wherein zinc sulfide is formed. Apparently, at a consequence thereof the zinc alumina spinel is readily regenerated by simply purging, or sweeping the sulfur compound therefrom with a hot, non-reactive, or inert gas after the zinc spinel has become sufficiently saturated with the sulfur compound. In the preferred practice of this invention, the zinc alumina spinel is simply contacted, purged, or swept with a hydrogen gas stream at elevated temperature to remove the hydrogen sulfide, and other sulfur compounds, and thereby regenerate the zinc alumina spinel. Suitably, the purge is conducted by maintaining the hydrogen gas at temperatures ranging from about 300° F. to about 1200° F., preferably from about 500° F. to about 1000° F. Since burning in the presence of oxygen as practiced in the regeneration of many sorbents is unnecessary, the hydrogen sulfide is recovered as hydrogen sulfide rather than as sulfur oxides. Consequently, the hydrogen gas stream itself is readily cleansed of the hydrogen sulfide by washing the gas with a caustic or amine solution.

The invention will be more fully understood by reference to the following comparative data illustrating its more salient features. All terms are given in terms of weight except as otherwise specified.

EXAMPLE 1

A zinc alumina spinel was precipitated by contacting a zinc-$H_2SO_4$ solution with the sodium aluminate, and then washing. It was then spray dried to form micron sized particles, and then reformulated into pellets of ⅛ inch average diameter. The pellets were then ground into a 14–35 mesh (Tyler Series) powder having a pore volume of 0.24 cm.$^3$/g and surface area of 234 m$^2$/g.

A 10 gram charge of the particulate mass of zinc alumina spinel was then calcined for 3 hours in air at 800° F., and then packed into a quartz tube which was placed in an infrared elliptically heated furnace. After adjusting the temperature to 200° F., at ambient pressure, hydrogen gas which contained 2000 ppm hydrogen sulfide was introduced at a flow rate of 600 cm$^3$/min. The flow was continued until hydrogen sulfide breakthrough at the exit side of the bed, breakthrough of the hydrogen sulfide having been detected by the use of lead acetate paper. From the time required, the known hydrogen sulfide concentration, and flow rate the hydrogen sulfide capacity of the adsorbent was readily determined. Subsequently, to regenerate the bed of zinc alumina spinel pure hydrogen was introduced into the bed and the bed heated either to 500° F. or 932° F. After regeneration, the bed was again cooled to 200° F. and the adsorption cycle repeated. Similar runs were made with an alumina desicant which replaced the zinc alumina spinel. The results are given in Table I.

TABLE I

| | | Wt. % S Adsorbed @ 200° F., 1 Atm. From A 2000 ppm $H_2S$ In $H_2$ Stream | | |
|---|---|---|---|---|
| Adsorbent | Wt. % Zn | Cycle 1 Original | Cycle 2 After $H_2$ Strip @ 932° F. | Cycle 3 After $H_2$ Strip @ 500° F. |
| $Al_2O_3$ | 0 | 0.17 | — | — |
| $ZnAl_2O_4$ Spinel | 31.3 | 1.89 | 1.78 | 0.84 |

From these data, it is apparent that the desiccant is far less effective, if not ineffective in removing hydrogen sulfide, and that the zinc alumina spinel shows a tenfold increase in capacity for removing hydrogen sulfide. Furthermore, the spinel shows the remarkable property of being regenerable by stripping with hydrogen at elevated temperatures.

Too, it will be observed, that when stripping with hydrogen at 500° F. nearly one half of the hydrogen sulfide adsorption capacity was restored; and when stripping with hydrogen at 932° F. nearly complete capacity for hydrogen sulfide adsorption was restored. These are important advantages over conventional zinc oxide which cannot be regenerated.

EXAMPLE 2

Further runs were conducted in a commercial reforming unit utilizing the one-eighth inch zinc alumina pellets as prepared in Example 1. In these runs, the hydrogen recycle stream from the last of a series of four on-stream reactors was passed through a zinc alumina spinel containing guard chamber at 100 psig, 125° F., and 7.1 SCF/min, and the zinc alumina spinel was then regenerated by contact with recycle hydrogen at elevated temperature; with a repetition of this cycle. Similar runs were also conducted with commercially supplied material, chabazite, used in place of the zinc alumina spinel, with the results given in Table II.

TABLE II

| Recycle Gas, 100 psig, 125° F., 7.1 SCF/Min. | | | | |
|---|---|---|---|---|
| Run No. | Cycle 1[1] | | Cycle 2[2] | |
| Desiccant | Chabazite | $ZnAl_2O_4$ Spinel[3] | Chabazite | $ZnAl_2O_4$ Spinel[4] |
| Average Inlet Conc. | | | | |
| $H_2S$, wppm | 1.9 | | 1.1 | |
| $H_2O$, wppm | 10.9 | | 11.9 | |
| $H_2$, Mole % | 58.0 | | 61.4 | |
| Time to $H_2S$ Breakthrough, Hrs. | 24.5 | 88.8 | 23.5 | 144.0 |
| Wt. % $H_2S$ on Desiccant | 0.055 | 0.138 | 0.028 | 0.176 |

[1]Reactivated upflow with recycle hydrogen gas for 4 hrs. @ 550–600° F.; cooled downflow with $N_2$.
[2]Reactivated upflow with recycle hydrogen gas for 8 hrs. @ 550–600° F.; cooled downflow with $N_2$.
[3]Witnessed 2 reactor swings.
[4]Witnessed 3 reactor swings.

These data show that, in the first cycle, the spinel had 2.5 times the capacity of the natural chabazite. Of more pertinence are the results obtained in the second cycle after regeneration with recycle hydrogen gas at 550°–600° F. In this instance, the spinel had 6.3 times the capacity of the chabazite. The longer regeneration time prior to the second cycle (8 hours vs. 4 hours) is believed to have caused the capacity increase from 0.138 to 0.176.%.

Small pore zeolites experience a drastic loss in hydrogen sulfide capacity under conditions wherein the desiccant is exposed to condensable hydrocarbons. For example, the capacity of the chabazite decreases to 0.007 wt. %. On the other hand, the spinel under the same conditions has a capacity of 0.12%, which is nearly 17 times greater. The larger pores of the spinel apparently prevent this capacity loss.

EXAMPLE 3

In this example, the zinc alumina spinel can be compared with zinc exchanged commercially known zeolites. Table III lists results obtained with Zn exchanged zeolites.

TABLE III

| $H_2S$ Adsorption On Zn-Exchanged Zeolites | | | |
|---|---|---|---|
| | | Wt. % S Adsorbed @ 200° F., 1 Atm. From A 2000 ppm $H_2S$ In $H_2$ Stream | |
| Adsorbent | Wt. % Zn | Cycle 1 Original | Cycle 2 After $H_2$ Strip @ 932° F. | Cycle 3 After $H_2$ Strip @ 500° F. |
| 4A Sieve | 0 | 0.22 | — | — |
| Zn 4A | 14.5 | 2.37 | 3.02 | 2.0 |
| Zn Exchanged Erionite | 5.79 | 1.12 | — | — |
| Natural Chabazite | 0 | 0.96 | — | — |
| Zn Chabazite | 6.33 | 1.51 | 1.87 | — |
| Na Mordenite | 0 | 1.08 | — | — |
| Zn Mordenite | 3.67 | 1.25 | — | — |

In every case, it will be observed that the zinc form had greater hydrogen sulfide capacity. The most remarkable improvement occurred with 4A. Zn exchange resulted in nearly 11 fold increase in the capacity of the 4A sieve. Moreover, this material is also easily regenerated by hydrogen stripping. Tests in a commercial reforming unit, however, showed that for one cycle Zn 4A retained more hydrogen sulfide than natural chabazite (0.10 vs. 0.04 wt. %) but less than $ZnAl_2O_4$ spinel.

These tests thus demonstrate a remarkable sulfur adsorption selectivity for $ZnAl_2O_4$ spinel. The ability to achieve low sulfur environments in the processing of sulfur-containing streams, with the added quality of less sorbent regeneration, with lesser environmental problems, is of considerable merit. The $ZnAl_2O_4$ spinel also has high capacity for moisture removal, apparently due to its high surface area. And, relative to the molecular sieves, the $ZnAl_2O_4$ spinel is inherently more stable to the high hydrochloric acidity of the recycle gas.

EXAMPLE 4

A portion of zinc alumina spinel was first calcined for 16 hours in air at 800° F. Seventy three grams of this material was packed into a glass column and heated to 209° F. A hydrofined cat naphtha feed containing 4.12 ppm sulfur was passed through the bed and fractions of the product was collected. It was found that the effluent consistently contained about 1 ppm sulfur or less which is suitable for many reforming reactions.

It is apparent that various modifications and changes can be made without departing from the spirit and scope of the invention.

For example, the metal alumina spinels can be used in combination with the zinc exchanged molecular sieves, e.g., by charging each type of adsorbent in guard chambers and using the guard chambers in series. The metal alumina spinels show a higher affinity for sulfur adsorption than the zinc exchanged molecular sieves, and the latter show good sulfur adsorption and supreior water adsorption.

Having described the invention, what is claimed is:

1. A process for the removal of sulfur from a sulfur containing process stream which comprises
   contacting said stream with a metal alumina spinel sorbent characterized by the formula $M Al_2O_4$ wherein M is chromium, iron, cobalt, nickel, copper, cadmium, mercury, or zinc to adsorb sulfur thereon.

2. The process of claim 1 wherein the metal alumina spinel is zinc alumina spinel.

3. The process of claim 1 wherein the metal alumina spinel, which contains adsorbed sulfur after completion of the sulfur sorption cycle, is contacted with an essentially non-reactive or reducing gas at elevated temperature, the sulfur being desorbed and the sorbent thereby regenerated.

4. The process of claim 3 wherein the gas employed to desorb the sulfur from the metal alumina spinel is comprised of hydrogen.

5. The process of claim 1 wherein the metal alumina spinel sorbent is zinc alumina spinel, and the zinc alumina spinel sorbent is contacted with an essentially hydrogen gas at elevated temperature to desorb the sulfur and regenerate the sorbent.

6. The process of claim 5 wherein the hydrogen is contacted with said zinc alumina spinel sorbent at temperatures ranging from about 300° F. to about 1200° F.

7. The process of claim 6 wherein the hydrogen is contacted with said zinc alumina spinel sorbent at temperatures ranging from about 500° F. to about 1000° F.

8. In a process for the removal of sulfur from a sulfur containing process stream wherein a series of on-stream reactors are provided with beds of a sulfur sensitive platinum-containing catalyst, a naphtha feed with hydrogen is cocurrently passed sequentially through said series of reactors, and a vaporous effluent rich in hydrogen is taken from the last reactor of the series, hydrogen is separated from the products and recycled, the improvement which comprises contacting said hydrogen recycle stream, prior to its recycle, with a metal alumina spinel sorbent characterized by the formula $$M\ Al_2O_4$$

wherein M is chromium, iron, cobalt, nickel, copper, cadmium, mercury, or zinc to adsorb sulfur thereon.

9. The process of claim 8 wherein the metal alumina spinel is zinc alumina spinel.

10. The process of claim 9 wherein the metal alumina spinel, which contains adsorbed sulfur after completion of the sulfur sorption cycle, is contacted with an essentially hydrogen gas at elevated temperature, the sulfur being adsorbed and the sorbent thereby regenerated.

11. The process of claim 9 wherein the metal alumina spinel sorbent is zinc alumina spinel, and the zinc alumina spinel sorbent is contacted with an essentially hydrogen gas at elevated temperature to desorb the sulfur and regenerate the sorbent.

12. The process of claim 11 wherein the hydrogen is contacted with said zinc alumina spinel sorbent at temperatures ranging from about 300° F. to about 1200° F.

13. The process of claim 12 wherein the hydrogen is contacted with said zinc alumina spinel sorbent at temperatures ranging from about 500° F. to about 1000° F.

* * * * *